United States Patent [19]

Falcoff et al.

[11] Patent Number: 5,371,599
[45] Date of Patent: Dec. 6, 1994

[54] RAPID COLOR SHADING PROCESS

[75] Inventors: Allan F. Falcoff, Chadds Ford, Pa.; Stuart Anderson, Bloomfield Hills, Mich.

[73] Assignee: E. I. Du Pont de Nemours and Company, Wilmington, Del.

[21] Appl. No.: 57,033

[22] Filed: May 5, 1993

[51] Int. Cl.$^5$ .............................................. G01J 3/50
[52] U.S. Cl. .................................. 356/405; 356/36; 356/243
[58] Field of Search ............... 356/36, 402, 405, 425, 356/243; 364/498, 526

[56] References Cited

U.S. PATENT DOCUMENTS

| | | | |
|---|---|---|---|
| 3,690,771 | 9/1972 | Armstrong et al. | 356/405 |
| 3,833,306 | 9/1974 | Komodromos | 356/434 |
| 4,379,696 | 4/1983 | Lerner | 434/98 |
| 4,403,866 | 9/1983 | Falcoff et al. | 366/132 |
| 4,479,718 | 10/1984 | Alman | 356/405 |
| 4,795,254 | 1/1989 | Kravetz | 356/243 |
| 4,887,217 | 12/1989 | Sherman et al. | 364/468 |
| 4,917,495 | 4/1990 | Steenhoek | 356/328 |

*Primary Examiner*—F. L. Evans
*Attorney, Agent, or Firm*—Patricia McGee

[57] ABSTRACT

A process for shading paint to match the color of a standard color paint which process involves the use of transparent film to optically simulate the effect of reading color through the conventional clearcoat layer, which eliminates the steps of cooling, spraying, flashing and baking the clearcoat with each iteration of test panels, with resultant significant decrease in process time.

9 Claims, No Drawings

RAPID COLOR SHADING PROCESS

FIELD OF THE INVENTION

This invention is related to a process and apparatus for shading paints to match a standard paint.

BACKGROUND OF THE INVENTION

Spray systems are well known in the paint industry for use in preparing painted test panels. Typically, a basecoat is sprayed onto the test panel and baked at a predetermined time and predetermined temperature to cure the paint. This is followed by applying a clearcoat which is sprayed over the basecoat and baked. The resultant panel is then compared against the standard color panel and if there is a color or other quality discrepancy, the batch of paint with which the panel was sprayed is modified accordingly. The modification process is known as shading. This time-consuming procedure, particularly for water-based basecoat and solvent-based clearcoat systems, of applying a basecoat, baking, then applying a clearcoat followed by baking, must be repeated for each shading iteration until the sample panel representing the batch color matches the color standard to a predetermined color tolerance range.

Traditionally, the shading process has been carried out by highly skilled and trained personnel who require extensive on-the-job experience to achieve proficiency in their craft. Since visual shading at best is an art, effective administration of the shading process was difficult.

In recent years, such visual shading has been supplemented by the use of apparatuses for instrumentally characterizing a paint or pigment composition. Colorimeters and spectrophotometers are well-known in the art and are used to measure the amount of light reflected at varying light wavelengths in the visible spectrum by a painted opaque panel that is held at a given angle relative to the direction of the incident light source. For nonmetallic paints, i.e., paints which do not contain any light-reflecting flakes or platelets, the reflectance factor has a minimum reflectance variation with the angle of the panel relative to the direction of incident light except at the gloss (specular) angle. Consequently, a single spectrophotometric reading at any specified angle will produce a reflectance value by which to accurately characterize the paint.

Metallic paints, on the other hand, contain light-reflecting flakes of such materials as aluminum, bronze, or coated mica. Such paints are characterized by "two-tone" or "flip-flop" effects whereby the apparent color of the paint changes at different viewing angles. This effect is due to the orientation of the flakes in the paint film. Since the color of such metallic paints will vary as a function of the angle of illumination and viewing, a single spectrophotometric reading is inadequate to accurately characterize the paint. Typically, three multiangular measurements are used to derive color constants for metallic paints. See, for example, Alman U.S. Pat. No. 4,479,718, issued Oct. 30, 1984 to Alman.

The color of the paint is described in $L^*$, $a^*$ and $b^*$ values which are coordinates in visual uniform color space and are related to X, Y & Z tristimulus values by the following equations which have been specified by the International Committee of Illumination:

$L^*$ defines the lightness axis
$L^* = 116(Y/Y_o)^{.166} - 16$
$a^*$ defines the red green axis
$a^* = 500[(X/X_o)^{\frac{1}{3}} (Y/Y_o)^{\frac{1}{3}}]$
$b^*$ defines the yellow blue axis
$b^* = 200[(Y/Y_o)^{\frac{1}{3}} - (Z/Z_o)^{\frac{1}{3}}]$ where
  $X_o$, $Y_o$ and $Z_o$ are the tristimulus values of the perfect white for a given illuminant;
  X, Y and Z are the tristimulus values for the color.

The color vectors for each of the colorants used to prepare the paint are provided and determined as discussed above. The color vector is the movement in color space, i.e., the change in the $L^*$, $a^*$ and $b^*$ values caused by the addition of a unit amount of each colorant used. For example.

$$\text{the color vectors for a color} = \begin{matrix} \partial L^*/\partial C^1 & \partial L^*/\partial C^2 & \partial L^*/\partial C^3 \\ \partial a^*/\partial C^1 & \partial a^*/\partial C^2 & \partial a^*/\partial C^3 \\ \partial b^*/\partial C^1 & \partial b^*/\partial C^2 & \partial b^*/\partial C^3 \end{matrix}$$

where C1, C2 and C3 are the concentration of pigment or tint used in the color.

The color technology used in the shading process is well known and is fully discussed in F. W. Billmeyer and M. Saltzman, *Principles of Color Technology*, John Wiley and Sons, New York, 2nd Edition, (1981). Of particular interest is an article by A. B. J. Rodrigues in Fifth International Conference in Organic Coatings Science and Technology Proceedings, Vol. 3, *Advances in Organic Coatings and Technology Series*. "Theory and Implementation of Modern Techniques of Color Conception, Matching and Control", p. 272–282, (1979).

The color measurement procedure can be automated through use of a computer. See, for example, Armstrong U.S. Pat. No. 3,690,771, issued Sep. 12, 1972, and Falcoff U.S. Pat. No. 4,403,866, issued Sep. 13, 1983.

The colorimeter used in the process is electrically connected to a computer and preferably determines the $L^*$, $a^*$ and $b^*$ values of the paint being prepared and feeds these values back to the computer. The colorimeter views the paint through the visible light spectrum of 400–700 nanometers (nm) for example, at 20 nm increments and calculates the $L^*$, $a^*$ and $b^*$ values for the paint based on this data. It is possible to feed process signals from the colorimeter generated by viewing the paint to the computer and have the computer determine the $L^*$, $a^*$ and $b^*$ values.

The computer takes these $L^*$, and $a^*$ and $b^*$ values and determines the difference between the $L^*$, $a^*$ and $b^*$ values of the paint being prepared and tolerance values for the standard paint ($\Delta L^*$, $\Delta a^*$ and $\Delta b^*$). With the vector information of the colorants and the $\Delta XL$, $\Delta Xa^*$ and $\Delta b^*$, the computer determines the amount of each of the colorants that is to be added to bring the paint within the tolerance values for the paint and activates the metering pumps which feed colorants into the mixing vessel. The above procedure, is repeated until the paint being prepared is with $L^*$, $a^*$ and $b^*$ tolerance values of the paint.

Reiterative spraying and baking of test panels with basecoat and clearcoat layers is a time consuming process. Typically, 25–40 minutes are required to spray, flash and bake, typically at 220° F., a waterborne basecoat. An additional hour is typically necessary to cool the test panel, spray, flash and bake, typically at 275° F., the solvent-borne clearcoat over the basecoat. There can be as many as 3–4 iterations, particularly for metallic paints, before the shading process will bring the paint batch into the range of acceptability for color tolerances.

The present invention decreases the overall time required to step through multiple iterations of the color shading process to reach an acceptable tolerance level for the batch of mixed paint, for both solid color and metallic paints.

SUMMARY OF THE INVENTION

This invention relates to an improved method for shading paint that matches the color values of a standard color paint. Transparent film optically simulates the effect of reading color values through a conventional clearcoat. Elimination of the need to apply clearcoat for every shading attempt decreases the time required in shading a paint within acceptable color value tolerances.

In one embodiment, a wet standard paint is sprayed onto the transparent film and baked conventionally. This film serves as the reference color plate against which successive transparent film sprayouts are compared in the shading process.

In another embodiment of the invention, the transparent film is prepared in parallel with a conventional color standard plate, and the difference in color values measured by a colorimeter or spectrophotometer is used as an offset reading for measurements against subsequent shading hits using only the transparent film. When the paint is within predetermined color tolerance values, a conventional plate is made for final color analysis.

DETAILED DESCRIPTION OF THE INVENTION

In the present invention, a clear Mylar ® GA-10 polyester film, or other clear plastic film, of a thickness sufficient to provide a surface that retains a smooth surface throughout the process is substituted for the metallic test panel for the first series of sprayouts and color measurements. The film used must be of uniform optical density and color, resistant to the solvent used in the spray process, and be able to withstand the temperatures used in baking the sprayed panel.

Mylar ® polyester film optically simulates the effect of reading color through the conventional clearcoat layer when measurements are taken from the non-sprayed side of the film panel, which eliminates the steps of cooling, spraying, flashing and baking the clearcoat with each iterations of test panels. Significant time can be eliminated by the absence of these steps.

For each sprayout, Mylar ® polyester film is cut to fit onto a 4"×6" metal panel. The film is taped on all sides to the metal panel. The metal panel is used to hold the Mylar ® film panel rigid and to prevent overspray from falling on the backside of the Mylar ® film panel.

A color standard can be prepared for reference against the test panels. One method of preparing such a standard is through a wet standard color paint. When a standard paint color has been defined, paint is shaded until consecutive sprayouts of that paint are within acceptable color tolerance limits to that standard. This paint, known as a wet standard, is sprayed onto a Mylar ® polyester film panel and baked conventionally. This panel will serve as the reference against which successive Mylar ® panels will be compared.

A conventionally prepared color standard may also be used as the color reference by determining the color offsets from the Mylar ® film panel as follows. The basecoat is sprayed in parallel onto the metal panel and a Mylar ® polyester film panel. Both panels are then baked in parallel, typically 220° F. for 10 minutes. The conventional metal panel is then sprayed with clearcoat and baked, typically at 275° F. for 30 minutes to cure this coating. A colorimeter or spectrophotometer is used to take color measurements on the metal panel and the Mylar ® polyester film panel. Measurements on the metal panel are taken through the clearcoat film, while on the Mylar ® panel the measurements are taken on the non-sprayed side of the Mylar ® sheet. The Mylar ® polyester film optically simulates the effect of reading color through the conventional clearcoat layer.

The color difference between the conventional metal panel and the Mylar ® panel is recorded for each color axis at each measuring angle. Each measurement is used as a unique offset correction value for successive Mylar ® polyester film sprayouts to obtain the conventional metal panel sprayout color position. During the shading process, the test sample Mylar ® panel color readings are adjusted by the offset measurements to obtain the equivalent clearcoat panel readings. This method is particularly useful when conventional metal panel color standards are available.

The measuring device may be directly linked to a computer which is programmed to automatically apply the Mylar ® film offset value to the reading of the successive sprayed film panels. The operator of the device will use only corrected values, where the corrected values are the raw Mylar ® film panel values adjusted for the Mylar ® to clearcoat offset correction factor.

The basecoat paint to be shaded is sprayed onto the clear Mylar ® polyester film through conventional spray techniques, and baked, typically at 220° F. for 10 minutes. After cooling, the film panel is released from the supporting metal panel. The color of the basecoat is then read through the Mylar ® polyester layer with a conventional colorimeter or spectrophotometer. The measuring device may be linked to a computer or other device which will automatically apply the offset values described above.

The shading computer is programmed to direct the operator to spray out test panels as either basecoat on a Mylar ® film panel or as a conventional basecoat/clearcoat on an aluminum panel depending on calculations by the computer. The computer will direct the operator to the metal panel readings if the total error recovered by the computer-predicted color additions is less than 0.05% of the total color movement at all angles and axes, $\Delta E$. At a level of 0.05% the computer will assume that no improvement can be accomplished.

The computer program will not release a batch of paint nor terminate shading based solely on color position measurements from the Mylar ® film panels readings. The computer will direct the operator to read the aluminum basecoat/clearcoat panel for the decision of final acceptability of color positions of the batch.

The computer will also direct an aluminum basecoat/clearcoat panel reading if the shading calculations is not able to determine a solution to the color movement based on the coloring vector components available to it and the current batch color position. In each of these two situations, the computer requires a more precise color position, one which does not include the Mylar ® film panel offset values calculated into the color values.

The computer will also direct an aluminum basecoat/clearcoat panel measurement based on the equivalent color difference or the predicted color difference after a new mixture referenced to the standard color panel. For non-metallic paints, if the measurements taken are within twice the predetermined tolerance for that angle, the computer will direct a conventional aluminum sprayout. For metallic paints, if all axis readings, at all three measurement angles, are within twice the tolerance for the specific reading angle, the computer will direct a conventional aluminum sprayout. Therefore, if the Near Specular reading is within ±2.4 units from the standard value, the Flat is within ±0.6 units from standard and the High reading is within ±1.2 color units the next sprayout will be on a conventional panel.

After the paint is prepared to meet the required color tolerance it can be packaged in suitable containers either automatically or manually by using conventional filling equipment and procedures. Additionally, other instruments can be included in this process which measures properties such as the hiding power of the paint, the viscosity and density of the paint. The data generated by these instruments may also be fed to the computer and calculations made so that additions of binder solutions, solvents and colorants can be adjusted to bring the paint within tolerances for the above properties as well.

If desired, the entire paint manufacturing process, or any combination of individual steps of the manufacturing process can be controlled by a computer. If the computer is electronically connected to metering pumps which control the supply of a component used in the paint and is electronically connected to the spectrophotometer, the computer can initiate the addition of accurately measured amounts of each component based upon the spectrophotometric readings and vector strength calculations of the computer.

Although it is less convenient to do so, any of the calculations required herein can be done without the aid of the computer simply by utilizing the proper mathematical formulations.

The following Examples illustrate the invention.

EXAMPLES

EXAMPLE 1

A 905.6 lb batch of white basecoat made of colorings, binder and solvents was produced. A Mylar ® polyester film panel having a thickness of five mils was sprayed and baked in parallel with a conventional aluminum panel. The metal panel was then coated with an acrylic clearcoat. Color measurements were taken using a X-Rite Model 968 Single Angle Spectrophotometer using one angle measuring geometery corresponding to the flat measuring angle. The Mylar ® offset values after measurement between the Mylar ® polyester film panel and the conventional metal panel were $\Delta L=1.72, \Delta a=0.38$, and $\Delta b=-1.65$. Tolerance values for L*, a* and b* are ±0.3 color units.

The Equivalent Panel Reading is defined as Mylar ® Panel Reading + Offset Value. Equivalent Panel Readings were used as the reference to the conventional panel standard color.

The colorants available for shading the white paint and their color vector movements are:

|        | Color Movement |        |        |
|--------|--------|--------|--------|
| Color  | L      | a      | b      |
| Black  | −1.980 | −0.040 | −1.380 |
| White  | 0.322  | −0.021 | −0.507 |
| Yellow | −0.440 | 0.390  | 2.140  |
| Red    | −0.407 | 0.562  | 0.222  |
| Green  | −0.165 | −0.618 | −0.189 |
| Purple | −0.749 | 1.296  | −0.743 |

The Mylar ® film panels were sprayed, baked and measured; this represents the on-load or initial position of the color values of the paint. The Mylar ® panel color offset to the conventional color standard plate was determined as:

|                          | ΔL   | Δa    | Δb    |
|--------------------------|------|-------|-------|
| Mylar ® Reading          | 1.06 | −1.28 | −2.04 |
| Offset Correction        | 1.72 | 0.38  | −1.65 |
| Equivalent Panel Reading | 2.78 | −0.90 | −3.69 |

The batch was light, slightly green and blue to the conventional color standard plate.

Based on the above color differences and the above color vector values, the computerized shading program recommended the following first shading hit:

|        | Color Movement |        |        |            |
|--------|--------|--------|--------|------------|
| Color  | L      | a      | b      | add weight |
| Black  | −1.980 | −0.040 | −1.380 | 27.7 g.    |
| Yellow | −0.440 | 0.390  | 2.140  | 477.3 g.   | and predicted the new color position relative to the conventional color standard to be $\Delta L=0.84, \Delta a=-0.27$ and $\Delta b=-1.12$.

Color measurements were made on the above paint after the above additions of black and yellow dispersions and the differences to the conventional color standard plate were measured:

|                          | ΔL    | Δa    | Δb    |
|--------------------------|-------|-------|-------|
| Mylar ® Reading          | −1.05 | −1.00 | −0.03 |
| Offset Correction        | 1.72  | 0.38  | −1.65 |
| Equivalent Panel Reading | 0.67  | −0.62 | −1.68 |

The computerized shading program recommended the following second shading hit:

|        | Color Movement |       |       |            |
|--------|--------|-------|-------|------------|
| Color  | L      | a     | b     | add weight |
| Yellow | −0.440 | 0.390 | 2.140 | 168.2 g.   |
| Red    | −0.407 | 0.562 | 0.222 | 17.0 g.    | and predicted the new color position relative to the conventional color standard to be $\Delta L=0.20, \Delta a=-0.10$ and $\Delta b=-0.36$.

Color measurements were made on the above paint after the above additions of black and yellow dispersions and the differences to the conventional color standard plate were measured:

|                 | ΔL    | Δa    | Δb   |
|-----------------|-------|-------|------|
| Mylar ® Reading | −1.32 | −0.60 | 0.93 |

-continued

|                       | ΔL   | Δa    | Δb    |
|-----------------------|------|-------|-------|
| Offset Correction     | 1.72 | 0.38  | −1.65 |
| Equivalent Panel Reading | 0.40 | −0.22 | −0.72 |

The batch was slightly light, within tolerance on the red axis and slightly blue to the conventional color standard plate.

The computerized shading program recommended the following third shading hit:

|        | Color Movement |       |       |            |
|--------|-------|-------|-------|------------|
| Color  | L     | a     | b     | add weight |
| Yellow | −0.440 | 0.390 | 2.140 | 77.4 g.    |
| Red    | −0.407 | 0.562 | 0.222 | 8.9 g.     | and predicted the new color position relative to the conventional color standard to be ΔL=0.17, Δa=0.04 and Δb=−0.10.

Color measurements were made on the above paint after the above additions of black and yellow dispersions and the differences to the conventional color standard plate were determined and are as follows:

|                          | ΔL    | Δa    | Δb    |
|--------------------------|-------|-------|-------|
| Mylar ® Reading          | −1.65 | −0.27 | 1.19  |
| Offset Correction        | 1.72  | 0.38  | −1.65 |
| Equivalent Panel Reading | 0.07  | 0.11  | −0.46 |

These values are within the aforementioned 2x tolerance values for L*, a* and b*.

This paint was sprayed onto a conventional aluminum panel and baked under standard conditions. The solvent-based clearcoat was then applied and baked under standard conditions. The color values were determined and color differences relative to the conventional color standard were as follows: ΔL=0.16, Δa=0.17, Δb=−0.26.

These values are within the aforementioned product tolerance values for L*, a* and b*. An acceptable paint was formulated.

In this example, the aluminum panel is sprayed in parallel with the Mylar ® film panel. The metal panel required only the addition of a clearcoat and was sprayed and baked for an additional one hour delay. For conventional sprayout color confirmation, the total time decrease using the Mylar ® film technique from the conventional technique was three hours.

EXAMPLE 2

A 3714 g batch of a charcoal grey metallic (black pearlescent) was formulated. Measurements are taken using a prototype X-Rite Model MA100 3-angle spectrophotometer. The angles correspond to the Near Specular, Flat and High measuring angles for measuring metallic automotive paints. Tolerance values from the conventional panel color panel are as follows:

| Angle         | ΔL    | Δa    | Δb    |
|---------------|-------|-------|-------|
| Near Specular | ±1.2  | ±1.2  | ±1.2  |
| Flat          | ±0.3  | ±0.3  | ±0.3  |
| High          | ±0.6  | ±0.6  | ±0.6  |

The paint is sprayed onto a Mylar ® film panel in parallel with a conventional aluminum panel. The conventional metal panel is successively sprayed with a solvent-borne acrylic clearcoat. Measurements taken give the following offset values:

| Angle         | ΔL    | Δa    | Δb   |
|---------------|-------|-------|------|
| Near Specular | −8.87 | 0.52  | 0.72 |
| Flat          | −0.46 | −0.18 | 0.09 |
| High          | −0.51 | −0.18 | 1.04 |

The Equivalent Panel Reading is defined as Mylar ® Panel Reading + Offset Value.

The colorants available for shading the charcoal grey metallic and their color vector movements as are follows:

|        | Near Specular |       |       | Flat  |       |       | High  |      |       |
|--------|-------|-------|-------|-------|-------|-------|-------|------|-------|
| Color  | L     | a     | b     | L     | a     | b     | L     | a    | b     |
| Black  | −2.82 | −0.07 | 1.99  | −1.95 | 0.32  | 0.25  | −0.43 | 0.00 | 0.29  |
| Violet | −1.48 | 2.66  | −3.43 | −1.20 | 1.45  | −1.23 | −0.44 | 0.80 | −0.38 |
| Blue   | −0.59 | −2.41 | −2.21 | −0.85 | −0.56 | −1.34 | −0.37 | 0.16 | −0.79 |
| Pearl  | 3.76  | −0.60 | −0.04 | 0.90  | 0.09  | −0.28 | 0.15  | 0.05 | −0.13 |

A Mylar ® film panel was sprayed and baked under standard conditions. The color position for the on-load, or initial position of the color values, was determined as follows:

|                          | Near Specular |      |      | Flat  |       |      | High  |       |       |
|--------------------------|-------|------|------|-------|-------|------|-------|-------|-------|
|                          | ΔL    | Δa   | Δb   | ΔL    | Δa    | Δb   | ΔL    | Δa    | Δb    |
| Mylar ® Reading          | 19.17 | 1.94 | 1.87 | 1.16  | 0.86  | 1.19 | 1.22  | 0.14  | −1.37 |
| Offset Correction        | −8.87 | 0.52 | 0.72 | −0.46 | −0.18 | 0.09 | −0.51 | −0.18 | 1.04  |
| Equivalent Panel Reading | 10.30 | 2.46 | 2.59 | 0.70  | 0.68  | 1.28 | 0.71  | −0.04 | −0.33 |

At the Near Specular angle, the batch equivalent reading is light, red and yellow to the conventional color standard plate; at the Flat angle, the batch is also light, red and yellow to standard; at the High angle, the batch is light and slightly blue to standard.

The computer directed that the sprayout to be on a conventional basecoat/clearcoat metal panel, because the predicted color position would be within the 2× tolerances aforementioned. The following first shading hit was recommended:

|  | Color Movement | | | | | | | | | |
|---|---|---|---|---|---|---|---|---|---|---|
|  | Near Specular | | | Flat | | | High | | | |
| Color | L | a | b | L | a | b | L | a | b | Add Weight |
| Black | −2.82 | −0.07 | 1.99 | −1.95 | 0.32 | 0.25 | −0.43 | 0.00 | 0.29 | 0 |
| Violet | −1.48 | 2.66 | −3.43 | −1.20 | 1.45 | −1.23 | −0.44 | 0.80 | −0.38 | 0 |
| Blue | −0.59 | −2.41 | −2.21 | −0.85 | −0.56 | −1.34 | −0.37 | 0.16 | −0.79 | 13.93 g. |
| Pearl | 3.76 | −0.60 | −0.04 | 0.90 | 0.09 | −0.28 | 0.15 | 0.05 | −0.13 | 0 | and predicted the new color position relative to the conventional color standard to be

| Near Specular | | | Flat | | | High | | |
|---|---|---|---|---|---|---|---|---|
| ΔL | Δa | Δb | ΔL | Δa | Δb | ΔL | Δa | Δb |
| 1.04 | 1.41 | 1.87 | −0.31 | 0.13 | 0.50 | −0.04 | −0.12 | 0.19 |

Color measurements were made on the above paint after the above addition of blue dispersion. Measurements were made on an aluminum clearcoated panel are were as follows:

|  | Near Specular | | | Flat | | | High | | |
|---|---|---|---|---|---|---|---|---|---|
|  | ΔL | Δa | Δb | ΔL | Δa | Δb | ΔL | Δa | Δb |
| Panel Reading | 3.16 | 0.55 | 1.66 | 0.32 | 0.01 | 0.78 | 0.24 | −0.09 | 0.15 |

At the Near Specular angle, the batch was light and yellow to the conventional color standard plate; at the Flat angle, the batch was slightly light and yellow to standard; at the High angle the batch is a good color match.

The computerized shading program recommended the following second shading hit with the sprayout to be done on a conventional aluminum basecoat/clearcoat panel:

|  | Color Movement | | | | | | | | | |
|---|---|---|---|---|---|---|---|---|---|---|
|  | Near Specular | | | Flat | | | High | | | |
| Color | L | a | b | L | a | b | L | a | b | Add Weight |
| Black | −2.82 | −0.07 | 1.99 | −1.95 | 0.32 | 0.25 | −0.43 | 0.00 | 0.29 | 0.158 g. |
| Violet | −1.48 | 2.66 | −3.43 | −1.20 | 1.45 | −1.23 | −0.44 | 0.80 | −0.38 | 9.367 g. |
| Blue | −0.59 | −2.41 | −2.21 | −0.85 | −0.56 | −1.34 | −0.37 | 0.16 | −0.79 | 7.139 g. |
| Pearl | 3.76 | −0.60 | −0.04 | 0.90 | 0.09 | −0.28 | 0.15 | 0.05 | −0.13 | 0 |

The computer program predicted the new color position relative to the conventional color standard to be:

| Near Specular | | | Flat | | | High | | |
|---|---|---|---|---|---|---|---|---|
| ΔL | Δa | Δb | ΔL | Δa | Δb | ΔL | Δa | Δb |
| 2.74 | 0.13 | 0.44 | −0.14 | 0.03 | 0.16 | 0.05 | 0.08 | −0.17 |

The aluminum panel was sprayed and baked under standard conditions. Measurements were taken with the following results:

|  | Near Specular | | | Flat | | | High | | |
|---|---|---|---|---|---|---|---|---|---|
|  | ΔL | Δa | Δb | ΔL | Δa | Δb | ΔL | Δa | Δb |
| Panel Reading | 0.88 | 0.67 | 0.52 | 0.13 | 0.06 | −0.05 | 0.01 | −0.15 | 0.06 |

These values are within the aforementioned tolerance values for all measurement angles and all color axes. Shading activity was stopped at this color position.

The complete shading cycle was completed using one Mylar ® film panel and two conventional aluminum panels. The decrease in process time relative to conventional sprayout techniques was greater than one hour.

What is claimed:

1. A process for shading paint that matches the color values L*, a* and b* of a standard color paint, said process comprising:
   a. spraying a transparent film with paint;
   b. measuring through said transparent film on the unpainted side and determining L*, a* and b* values of said sprayed paint by a colorimeter or spectrophotometer;
   c. comparing said measured L*, a* and b* values of said sprayed film to L*, a* and b* values of a color standard;
   d. computing the difference between said L*, a* and b* values of said sprayed film relative to L*, a* and b* values of said standard to determine the quantities of components to be added to said paint to bring said paint to within L*, a* and b* tolerance values of the paint;
   e. adding quantities of colorants to said paint to bring said paint within L* a* and b* tolerance values for the paint; and
   f. repeating steps a through e at least once in the event said paint is not within selected color tolerances until said paint is within said L*, a* and b* tolerance values.

2. The process as claimed in claim 1 wherein said L*, a* and b* values are measured with a spectrophotometer.

3. The process as claimed in claim 1 wherein the said color standard is prepared by spraying a transparent film with a wet standard color paint and baking.

4. The process as claimed in claim 1 wherein said color standard is prepared by
   a. spraying a transparent film with basecoat paint;
   b. spraying a metal panel with basecoat paint;

c. baking said painted film and said painted metal panel in parallel;

d. spraying said baked metal panel with clearcoat paint;

e. baking said sprayed metal panel to cure said clearcoat paint;

f. measuring the L*, a* and b* values of said painted film through the unpainted side with a colorimeter;

g. measuring the L*, a* and b* values of said painted metal panel through said clearcoat with a colorimeter; and h. calculating the difference between said L* a* and b* of said painted film and said metal panel to determine offset values of said painted film.

5. Process as claimed in claim 4 wherein said color components are measured by a spectrophotometer.

6. The process of claim 1 wherein one of the components of the paint contains metallic flake pigments.

7. The process of claim 1 wherein a spectrophotometer which measures a spectral curve of a color sample is electrically connected to a computer which is programmed to determine the L*, a* and b* values from the spectral curve and transmits these values to the computer and compare to predetermined tolerance values to prepare a paint within the L*, a* and b* tolerance values.

8. The process of claim 1 wherein the L*, a* and b* values determined from a spectral curve of a color and tolerance values for the paint are transmitted to a computer to prepare a paint within tolerance values.

9. The process of claim 4 wherein in preparing said color standard said transparent film and said metal panel are sprayed in parallel.

* * * * *